United States Patent Office 3,460,542
Patented Aug. 12, 1969

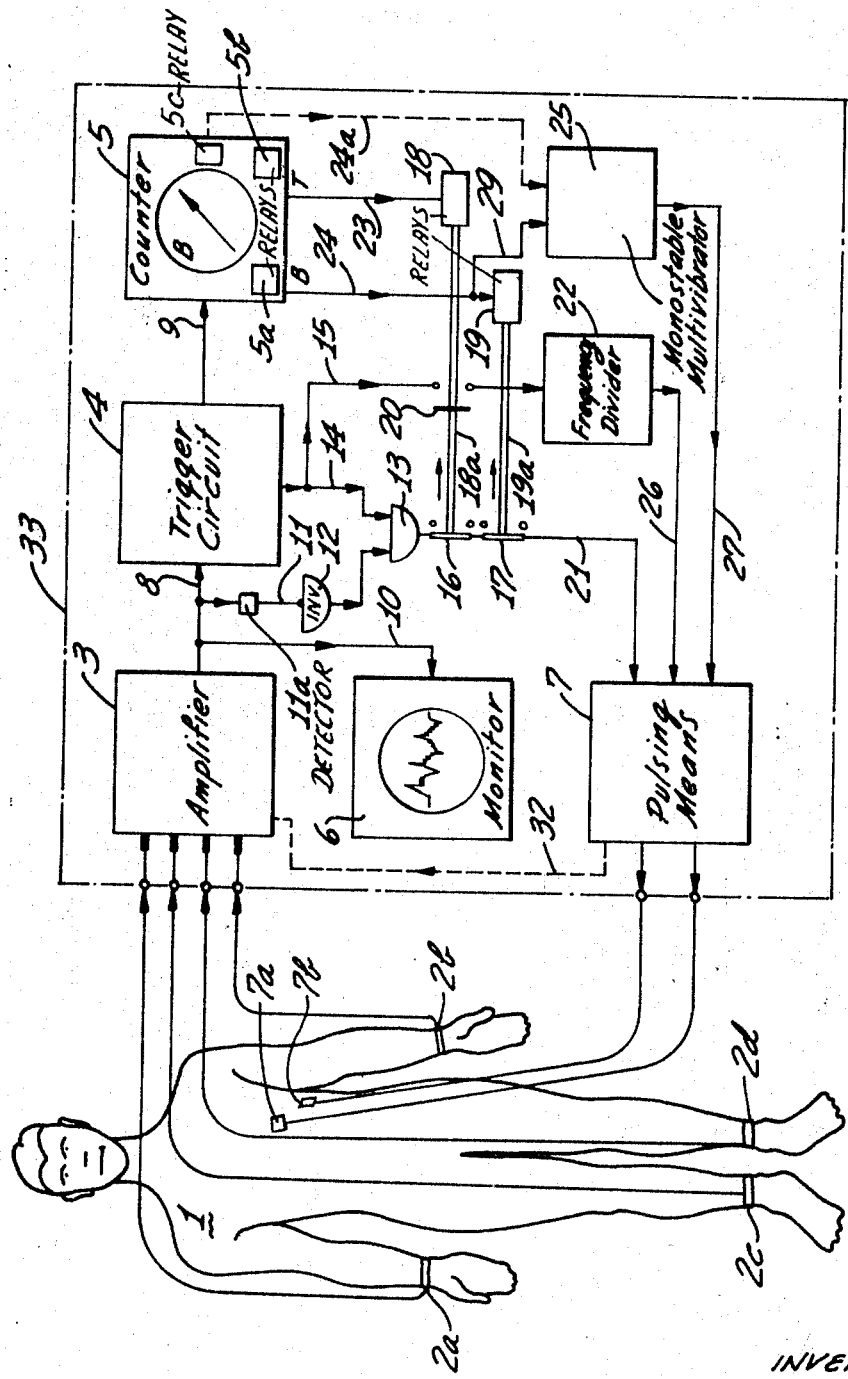

3,460,542
INSTRUMENT FOR ELECTRICALLY STIMULATING THE ACTIVITY OF THE HEART
Alfred Gemmer, Berlin-Frohnau, Germany, assignor to Fritz Hellige & Co. G.m.b.H., Freiburg im Breisgau, Germany
Filed Feb. 2, 1967, Ser. No. 613,472
Claims priority, application Germany, Feb. 9, 1966, H 58,492
Int. Cl. A61b 5/04
U.S. Cl. 128—421　　　　　　　　　　3 Claims

ABSTRACT OF THE DISCLOSURE

An instrument for electrically stimulating the activity of the heart. The instrument is useful for the following abnormalities: tachycardia, a condition where the heart beats too fast; bradycardia, a condition where the heart beats too slow; arrhythmia, a disturbance in the rhythm of the heart; and, a feeble heart beat.

The principal components used in an illustrative embodiment of the instrument are: probes connected to the body of the patient for receiving heart signals; a source of signals which stimulate the heart which differ from but vary with the input heart signals; a second source of signals which stimulate the heart which have a preset fixed frequency; and a pulsing means for selectively stimuating the heart with signals from said first source and with signals from said second source, in a manner which depends on the type of pulsations sensed by the probes.

Summary of the invention

The pulsations of the heart beat are sensed by body probes or electrodes connected, for example, to the arms and legs of the patient. These pulsating signals are sent, either directly or by means of transducers, to an amplifier. The output of the amplifier goes to a trigger circuit which produces pulses which are synchronized with the heart pulsations.

For the treatment of a feeble heart beat, the amplified signal from the amplifier goes to a detector circuit including a threshold detector having an output which goes to an inverter. The inverter has an output going to an AND gate only if the signal going to the threshold detector was below a certain amplitude. Pulses from the trigger circuit also enter the AND gate. The AND gate, therefore, has an output only under the following conditions: the signal at the output of the amplifier is below a certain threshold level, and the output from the trigger circuit is synchronous with the pulsations of the natural heart beat. When these conditions are met, the pulsing means thereupon sends a signal to electrodes near the heart of the patient. This signal, therefore, reinforces the feeble heart beat.

For the treatment of bradycardia, the output signal from the trigger circuit enters the heart frequency indicator. When the frequency of the pulses is below a predetermined number, the indicator energizes a sensing relay which activates a monostable multivibrator. The controlled frequency of the multivibrator is set at a value within the normal range of heart pulsations. The output of the multivibrator sends a signal into the pulsing means. The pulsing means thereupon sends pulses of the desired frequency to the electrodes.

For the treatment of tachycardia, another sensing relay in the counter is energized. This permits the output from the trigger circuit to enter a frequency divider, for example a bistable multivibrator. The frequency of the output of this multivibrator is designed to be less than the frequency of its input. Thus, pulses having a reduced frequency then enter the pulsing means, from where they are sent to the electrodes.

In the instance of arrhythmia, a third sensing relay is provided, also controlled by the counter, and connected to a pulse generator, for example a monostable multivibrator whose output frequency is adjustable. Usually, a single strong pulse is sent, or at most a few pulses are sent, to the patient through the electrodes.

Brief description of the drawing

The figure shows one embodiment of the instrument for electrically stimulating the activity of the heart.

Detailed description of the invention

In the therapeutical treatment of abnormalities in the rhythm or frequency of heart activity, increasing importance is attached to electrically-produced stimulation of the heart by means of defibrillators and Pacemakers. Among the most frequency casts wherein Pacemakers are used, cardiac disorders involving the atrium and the ventricle, accompanied by intermittent or complete inactivitiy of the heart, should be mentioned. In contrast with defibrillation, wherein mostly only a signal, however strong, voltage pulse is used, Pacemakers are employed to stimulate the heart into its normal activity for an extended period of time in a continuous manner. Electrical pulses supplied by Pacemakers substitute for or amplify the natural excitation at the sinus, which is the center of natural stimulus in the heart. At the present stage of development of therapeutic methods, stimulation by means of a Pacemaker is actually employed in connection with most cases of tachycardia, bradycardia and arrhythmia and also in cases of insufficient strong natural heart excitation, in order to thereby excite or sustain heart activity at the normal frequency.

It is one of the main purposes of the present invention to provide a Pacemaker which may be effectively used in connection with all potential cases of disturbances in the heart rhythm. It is well known that the stimulating pulses from the Pacemaker can be controlled or triggered in synchronism with the naturally occurring heart pulsations, by deriving pulses from marked phases of the heart activity voltage, for example from the R-point, the most-pronounced point of the QRS-complex of the heart activity voltage, related to the ventricular systole. However, up to the present time, such synchronous excitation has been generally considered necessary when the spontaneous natural heart excitation occurred within a normal range of frequencies. On the other hand, in more frequently occurring situations, use has been made in the prior art of an asynchronous imposed control of the Pacemaker because it has been believed appropriate to use such control in cases of tachycardia, bradycardia or arrhythmia in order to excite the heart into activity at normal frequency such as 70 pulses per minute, as the heart is beating, respectively, too fast, too slow, or irregularly. However, for physiological reasons, synchronous stimulation of the heart controlled by its own natural stimulus is to be considered preferably to asynchronous stimulation.

In accordance with the present invention, an instrument for electrically stimulating the activity of the heart is provided, which is useful in connection with the various types of disturbances of normal heart rhythm, the instrument also particularly permitting synchronous superimposed excitation in cases of tachycardia. The characterizing features of such improved instrument for electrically stimulating the heart activity are defined in the claims. In accordance with a particular characterizing feature, in cases of tachycardia, the stimulating pulses are produced at a fraction of the heart beat frequency, preferably at half of the frequency at which spontaneous natural heart activity occurs.

The instrument in accordance with the invention will now be described in connection with the schematic diagram shown in the drawing. As illustrated in the drawing, an instrument 33 is used for stimulating the heart activity of a patient 1, the instrument including as an essential component monitoring equipment permitting control of the heart function of the patient 1 and also permitting diagnosis of the disturbance. The instrument includes a pulsing means 7 which supplies pulses through electrodes 7a and 7b arranged in the vicinity of the patient's heart, with the pulses being supplied at a frequency which is either independently selectable or synchronously controlled by the heart frequency itself.

The heart action pulsations as produced by the natural heart function of the patient, are taken off by the body electrodes 2a, 2b, 2c, 2d, of which only the electrodes attached to arms and legs are shown in the drawing. Of course, electrodes attached to the chest could be used, too. These pulsations are sensed directly, or may be transduced to voltages which are supplied to an amplifier 3, wherein the signals corresponding to the pulsations at the electrodes are properly selected in a manner known in the prior art and are amplified for the purpose of controlling the measuring, pulse-forming, and indicating instruments which are connected to the amplifier 3. By way of example, the oscilloscope 6 used as one such monitoring device is shown in the drawing as being connected through connecting lead 10 to the output from amplifier 3.

In order to control the operation of the pulsing means 7 in a synchronous manner, it is necessary to derive pulses from the amplified measuring signals, as is known in the prior art, so that the pulse frequency will then be equal to that of the heart beat. This purpose is accomplished by means of a trigger circuit 4 connected to the amplifier output by lead 8. The structure and design of trigger circuits such as circuit 4 are well known in the art. The trigger pulses are derived from the QRS-complex of the heart voltage diagram, and in the described embodiment one of their uses is for controlling the heart frequency indicator instrument 5, this instrument 5 being connected to the trigger circuit 4 through lead 9. Another use will be described subsequently.

The heart frequency indicating instrument 5 is provided with an integrating circuit for counting the single pulses as they occur during a predetermined interval of time. The magnitude monitored by instrument 5 is an average value of frequency, for example the number of pulses per minute.

Monitor 6 in combination with amplifier 3 serves as an electrocardiograph. As long as the electrocardiograph associated with the equipment herein described is used as the monitoring instrument, the frequency-indicating instrument 5 is adapted to energize sensing relays 5a or 5b in such a manner that relay 5a is energized in cases of bradycardia, i.e. when the frequency of the heart beat is below a predetermined, selectable range of heart beat frequencies, and relay 5b is energized in cases of tachycardia, i.e. when the frequency is above the predetermined, selectable range of heart beat frequencies.

In accordance with an improved embodiment of the instrument, a third relay 5c may be provided which is energized in cases of arrhythmia. Methods for detecting irregularities in frequency, such as those typical for arrhythmia, are well known in the prior art. One method in which it may be done involves counting the number of heart pulsations within two consecutive and equal time intervals. If the two counts differed by more than a stipulated amount, it could be assumed that arrhythmia existed.

For electrically stimulating the heart beat, the relays 5a, 5b, or equivalent components, are used. They are connected to energize components which, in turn, control the operation of the pulsing means 7. The pulsing means 7 is constructed in a manner which is known in the medical electronics art.

In order to first describe how the pulsing means 7 is operated in a mode of asynchronous, superimposed control, as the most frequency used mode, especially for bradycardia, there is a frequency-controlling component conected between the corresponding relay and the pulsing means 7. This component may be a monostable multivibrator 25, as shown in the presently discussed embodiment of the instrument, to permit, for example in the case of bradycardia, asynchronously stimulating the heart. As shown in the figure, this monostable multivibrator 25 is connected by the lead path designated 24, 29 and 27, between the relay 5a, which is energized in cases of bradycardia, and the pulsing means 7.

In accordance with one of the main features of this invention, in case of tachycardia, heart activity is to be stimulated in a synchronous manner, however, at a frequency reduced to a predetermined fraction, generally to one-half of the natural frequency. Therefore, in accordance with the invention, the pulsing means 7 is connected to the output from the trigger circuit 4 through leads 15 and 26 with a bistable multivibrator or an equivalent flip flop 22 being inserted in the leads. In order to produce the required half-frequency, each trigger pulse produced by trigger circuit 4 in synchronism with the heart pulse, causes the bistable multivibrator to switch from one to the other of its stable states, so that rectangular pulses are produced in the output lead 26 from the multivibrator 22 having a frequency which one is half of the frequency of the trigger pulses which are supplied to the input of the multivibrator. The rectangular pulses are used for controlling the output frequency of the pulsing means 7, which is designed in such a manner that it produces, either a positive-going or negative-going rectangular pulse to thereby supply stimulating pulses to electrodes 7a and 7b. In order to insure that this mode of stimulation enters into operation only in case of tachycardia, a switch 20 is inserted in the connecting lead 15 between trigger circuit 4 and the bistable multivibrator 22, the switch being operative to form a connection only when the sensing relay 5b, and therewith the power relay 18 are energized, as occurs in cases of tachycardia. Energization of relay 18 also opens up switch 16.

Another instance where synchronous stimulation is desirable is the case when spontaneous heart activity, though occurring at normal frequency, is very feeble. Synchronous stimulation involves amplifier 3, detector 11a, inverter 12, trigger circuit 4, gate 13 and pulsing means 7. The amplified signal from amplifier 3 enters the threshold detector 11a. Detector 11a has an output 11 indicative of the fact that the pulsations of the heart activity do not exceed a predetermined amplitude. The inverter 12 produces an output signal which is supplied to the AND gate 13 only when the signals from the amplifier output have an ampltiude which is below the threshold level of detector 11a.

A pulse from trigger circuit 4 also enters AND gate 13 by means of lead 14. AND gate 13 has an output only when there are coincident inputs from inverter 12 and lead 14. This insures that a signal is sent to the pulsing means 7 which is in exact synchronism with the spontaneous heart beat as well as insures that a pulsing signal is sent to the electrodes 7a and 7b from the pulsing means 7 only when the pulsations from the spontaneous heart beat are below a certain predetermined level.

The mode of synchronous control of the pulsing means 7 as described in the foregoing paragraph should only enter into action when neither bradycardia nor tachycardia are present. In order to accomplish this, two switches 16 and 17 are provided in the leads between the pulsing means 7 and the gate 13, with switch 16 being activated by the tachycardia relay 18 and switch 17 being operated by the bradycardia relay 19, which latter relay 19 is connected for energization by relay 5a through lead 24 for cases of bradycardia.

The three described modes (for bradycardia, tachycardia and feeble heart beat) for stimulation of heart activity are mutually exclusive alternatives, and it will be noted that the circuit described operates in accordance with this requirement.

There exists a fourth mode which should be mentioned, namely a mode for stimulation in cases of arrhythmia. Whenever, in these cases, only asynchronous control is desired, the operating mode is effected as in the case of bradycardia. This possibility is indicated in the drawing by an additional dashed-line lead 24a between a special arrhythmia relay 5c of the heart beat frequency indicator 5 and the monostable multivibrator 25. This connecting lead 24a applies control pulses to the monostable multivibrator in the case of arrhythmia which cannot be diagnosed with certainty as being bradycardia or tachycardia.

The switches 16 and 17 may be replaced by logic switching, whose outputs should be connected with the logic switching element 13, i.e. an AND gate, so that the described functional cooperation is precisely the same as already described. Then, the mentioned switching elements would be replaced by inverters, or NOT gates, whose outputs supply control signals only in the absence of tachycardia and bradycardia. Similar considerations prevail with respect to switch 20, inasmuch as then the leads 15 and 23 would be connected to the input of a logic switch element operating as an AND gate whose output would be connected to the bistable multivibrator 22.

Moreover, a further important circuit modification is indicated by the dashed connection line 32 between the pulsing means 7 and amplifier 3, this modification permitting short-term deenergization of the amplifier through suitable electronic switching means which are operative upon the occurrence of a pulse from the pulsing means 7 in order to prevent feedback between the pulsing means 7 and the amplifier 3 through electrodes 7a and 7b and body electrodes 2a, 2b, 2c and 2d.

Suitable appropriate arrangements of the different components are known in the art such as those of the amplifier 3, the trigger circuit 4, the integrating circuit for the heart beat frequency indicator 5, the bistable multivibrator 22 and the monostable multivibrator 25, as well as the pulsing means 7 and the mentioned logic switching elements. The present invention is essentially concerned with the manner in which the components are interconnected and combined, in order to provide an instrument which, in a highly automated manner, causes immediate operation of the pulsing means 7, depending on the strength and the frequency of the heart beat, by producing the most suitable mode of stimulation. Continuous control of patients with heart beat disturbances is therefore greatly facilitated, this fact constituting an advantageous feature, which is particularly useful in hospitals.

Whereas a preferred embodiment of the invention has been shown and described herein, it should be realized that there are many modifications, substitutions and alterations thereto within the scope of the following claims.

What is claimed is:

1. Apparatus for detecting various pulsations of the heart and for electrically stimulating the heart in response to said pulsations, comprising:
   sensing means for sensing said pulsations of the heart;
   amplifier means connected to said sensing means for receiving and amplifying said pulsations of the heart;
   trigger means for receiving said amplified pulsations from said amplifier means, said trigger means having first and second outputs;
   circuit means having first and second inputs connected to the output of said amplifier means and said first output of said trigger means, respectively, said circuit means including detection means for detecting the amplitude of said pulsations of the heart, said circuit means responsive to said pulsations of the heart below a predetermined amplitude, said circuit means for providing first and second outputs synchronized with said pulsations of the heart, said second output occurring when said pulsations are below said predetermined amplitude;
   counter means connected to said second output of said trigger means and responsive to said pulsations of the heart, said counter means including a plurality of first relay means for providing respective outputs of said counter means depending upon the character of said pulsations;
   monostable multivibrator means for receiving outputs from said counter means and for providing output pulses;
   frequency divider means for providing output pulses;
   pulsing means for selectively receiving responsive outputs from said monostable multivibrator means, said frequency divider means, and said circuit means, said pulsation means adapted to provide responsive electrical stimulating signals to said heart; and
   second relay means for selectively coupling respective outputs from said circuit means to said frequency divider means and said pulsing means, respectively.

2. Apparatus as recited in claim 1 wherein said monostable multivibrator means is responsive to respective outputs from said counter means upon actuation of either one of two of said plurality of first relay means, and said monostable multivibrator means provides output pulses for ensuring asynchronous electrical stimulation of the heart.

3. Apparatus as recited in claim 1 wherein said pulsing means is selectively responsive to respective outputs from said circuit means and said frequency divider means, and said pulsing means provides output pulses for ensuring synchronous electrical stimulation of the heart.

References Cited

UNITED STATES PATENTS 3,144,019    8/1964    Haber.
3,156,235    11/1964    Jaeger.

FOREIGN PATENTS 826,766    1/1960    Great Britain.

OTHER REFERENCES

German printed application, No. 1,067,538, Oct. 22, 1959, Frank.

WILLIAM E. KAMM, Primary Examiner

U.S. Cl. X.R.

128—2